US008258254B2

(12) United States Patent
Inoue et al.

(10) Patent No.: US 8,258,254 B2
(45) Date of Patent: Sep. 4, 2012

(54) BIODEGRADABLE RESIN, BIODEGRADABLE RESIN COMPOSITION, BIODEGRADABLE MOLDED OBJECT, AND PROCESS FOR PRODUCING BIODEGRADABLE RESIN

(75) Inventors: Kazuhiko Inoue, Tokyo (JP); Midori Yamashiro, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 953 days.

(21) Appl. No.: 10/518,859

(22) PCT Filed: Jun. 16, 2003

(86) PCT No.: PCT/JP03/07594
§ 371 (c)(1),
(2), (4) Date: Dec. 17, 2004

(87) PCT Pub. No.: WO03/106539
PCT Pub. Date: Dec. 24, 2003

(65) Prior Publication Data
US 2006/0025560 A1 Feb. 2, 2006

(30) Foreign Application Priority Data

Jun. 17, 2002 (JP) ................................. 2002-175646

(51) Int. Cl.
C08F 295/00 (2006.01)
(52) U.S. Cl. ......... 528/298; 525/301; 525/302; 528/271
(58) Field of Classification Search .................. 525/298, 525/301, 302; 528/271
See application file for complete search history.

(56) References Cited

U.S. PATENT DOCUMENTS

| 3,458,460 | A | | 7/1969 | Shepard et al. |
| 3,872,057 | A | | 3/1975 | Pazos |
| 4,661,558 | A | | 4/1987 | Bell et al. |
| 5,043,396 | A | | 8/1991 | Kitahara et al. |
| 5,178,989 | A | | 1/1993 | Heller et al. |
| 5,489,451 | A | | 2/1996 | Omeis et al. |
| 5,491,210 | A | * | 2/1996 | Onwumere et al. ............. 528/28 |
| 6,018,033 | A | * | 1/2000 | Chen et al. ...................... 536/4.1 |
| 6,146,655 | A | * | 11/2000 | Ruben ............................ 424/443 |
| 6,207,762 | B1 | * | 3/2001 | Kobayashi et al. ........ 525/327.1 |
| 6,746,562 | B2 | * | 6/2004 | Chino et al. ................. 156/308.2 |
| 2004/0059101 | A1 | * | 3/2004 | Weissler et al. .............. 536/17.4 |
| 2004/0093080 | A1 | * | 5/2004 | Helmus et al. ............... 623/2.41 |

FOREIGN PATENT DOCUMENTS

| EP | 0 134 649 A2 | 3/1985 |
| EP | 0 870 793 A2 | 10/1998 |
| JP | 60-179479 | 9/1985 |
| JP | 61-205447 | 9/1986 |
| JP | 06-192375 | 7/1994 |
| JP | 07-247364 | 9/1995 |
| JP | 09-031176 | 2/1997 |
| JP | 10-508655 | 8/1998 |
| JP | 11-035675 | 2/1999 |
| JP | 11-106578 | 4/1999 |
| JP | 11-035675 | * 9/1999 |
| JP | 2000-001529 | 1/2000 |
| JP | 2000-34376 | 2/2000 |
| JP | 2000-063511 | 2/2000 |
| JP | 2000-281805 | * 10/2000 |
| JP | 2001-040078 | 2/2001 |
| JP | 2001-081240 | 3/2001 |
| JP | 200260422 | * 2/2002 |
| JP | 2002-234934 | 8/2002 |
| JP | 2003-064246 | 3/2003 |
| JP | 2003-183348 | 7/2003 |
| WO | WO 95/20629 A1 | 8/1995 |
| WO | WO 96/15159 | 5/1996 |
| WO | WO 97/03130 | 1/1997 |
| WO | WO 98/15347 A1 | 4/1998 |
| WO | WO 98/55147 A1 | 12/1998 |
| WO | WO 02/16378 | * 2/2002 |
| WO | WO 02/49573 A21 | 6/2002 |

OTHER PUBLICATIONS

Merck Index Diels-Alder reaction, ONR-23, Merck and Co, 1996.*
M. R. Tant et al., Ionomers, Synthesis Structure Properties and Applications, (ISBN: 0-7514-0392-X).
Masahiro, et al., Keihjo Kioku Polymer no Zairyo Kaihatsu), Development of Shape-memory Polymers, (ISBN 4-88231-064-3).
Japanese Patent Application Laid Open (JP-A) No. 06-192375, dated Jul. 12, 1994, together with English-language Abstract.
L.P. Engle, et al., "A Review of Thermally Controlled Covalent Bond Formation in Polymer Chemistry", J. Macromol. Sci. Re. Macromol. Chem. Phys., vol. 33, No. C3, pp. 239-257, 1993.
Nakane et al., "Vinyl Ether Blocked Carboxylic Acid and Its Application", Shikizai, (Coloring Matetrial), vol. 67, No. 12, pp. 766-774, 1994.
Nakane et al., "Carboxylic Acid Blocked by Vinyl Ether and Its Application (II) Effect of catalyst on curing reaction of the cross linking system with epoxide", Shikizai (Coloring Material), vol. 69, No. 11, pp. 735-742, 1996.
Japanese Patent Application Laid-Open (JP-A) No. 11-035675, dated Feb. 2, 1999, together with English-language Abstract.
Japanese Patent Application Laid Open (JP-A) No. 07-247364, published Sep. 26, 1995, together with English-language Abstract.
Japanese Patent Application National Publication (Laid-Open) No. 10-508655, dated Aug. 25, 1998 with Abstract of corresponding WO 96/15159 published on May 23, 1996.
Japanese Patent Application Laid-Open (JP-A) No. 11-106578, dated Apr. 20, 1999, together with English-language Abstract.

(Continued)

Primary Examiner — Gregory Listvoyb
(74) Attorney, Agent, or Firm — Scully, Scott, Murphy & Presser, P.C.

(57) ABSTRACT

A biodegradable resin having sufficient heat resistance, molding property and recycling property can be obtained, without losing biodegradability, by introducing a covalently bonded and thermo-reversible cross-linked structure into a biodegradable resin. Heat resistance, molding property, recycling property and biodegradability can be further improved, if necessary, by setting the cleaving temperature of a cross-linked structure in a given range, selecting the kind of a cross-linked structure, and making a three-dimensional cross-linked structure.

6 Claims, No Drawings

OTHER PUBLICATIONS

Japanese Patent Application Laid-Open (JP-A) No. 2000-34376, dated Feb. 2, 2000, together with English-language Abstract.
Japanese Patent Application Laid-Open (JP-A) No. 2000-281805, dated Oct. 10, 2000, together with English-language Abstract.
Yano Shinichi, Ionomer no bussei to Kougyouteki Ouyou (Physical Property and Industrial Application of Ionomer).
M. R. Tant et al., Ionomers, Synthesis Structure Properties and Applications, (ISBN: 0-7514-0392-X).
Chan-Ming Dong et al., "Synthesis of star-shaped poly (D.L-lactic acid-alt-glycolic acid) with multifunctional initiator and $SnOct_2$ catalyst", Polymer, vol. 42, pp. 6891-6896, 2001.
Ruckenstein, et al., "Crosslinking of Chlorine-Containing Polymers by Dicyclopentadiene Dicarboxylic Salts", Journal of Polymer Science: Part A: Polymer Chemistry, vol. 38, pp. 818-825 (2000).
U.S. Patent No. 3,872,057, granted Mar. 18, 1975 to Pazos.
Japanese Patent Application Laid-Open (JP-A) No. 60-179479, dated Sep. 13, 1985.
Chujo et al., "Reversible Gelation of Polyoxazoline by Means of Diels-Alder Reaction", American Chemical Society (Macromolecules, vol. 23, 2636-2641 (1990).
Canary, et al., "Thermally Reversible Crosslinking of Polystyrene via the Furan-Maleimide Diels-Alder Reaction", Journal of Polymer Science: Part A: Polymer Chemistry, vol. 30, pp. 1755-1760 (1992).
Masahiro, et al., Keihjo Kioku Polymer no. Zairyo Kaihatsu), Development of Shape-memory Polymers, (ISBN 4-88231-064-3).
U.S. Patent 5,043,396 granted Aug. 27, 1991 to Kitahara et al.
U.S. Patent No. 5,491,210, granted Feb. 13, 1996 to Onwumere, et al.
U.S. Patent No. 5,489,451, granted Feb. 6, 1996 to Omeis, et al.
International Publication No. WO 96/15159 dated May 23, 1996.
Japanese Patent Publication No. 2000-001529, published Jan. 7, 2000, together with English-language Abstract.
Japanese Patent Publication No. 2001-081240, published Mar. 27, 2001, together with English-language Abstract.
Japanese Patent Publication No. 61-205447, published Sep. 11, 1986, together with English-language Abstract.
European Patent Publication No. 0 134 649A2, published Mar. 20, 1985.
International Publication WO 95/20629 A1, published on Aug. 3, 1995.
European Patent Publication 0 870 793A2, published Oct. 14, 1998.
International Patent Publication WO 98/15347A1, published Apr. 16, 1998.
International Patent Publication WO 98/55147A1, published Dec. 10, 1998.
Japanese Patent Publication No. 2003-183348, published Jul. 3, 2003.
International Publication No. WO 97/03130, published on Jan. 20, 1997.
Japanese Patent Publication No. 2001-040078, published Feb. 13, 2001, together with English-language Abstract.
Japanese Patent Publication No. 2000-063511, published Feb. 29, 2000, together with English-language Abstract.
Japanese Patent Publication No. 09-031176, published Feb. 4, 1997, together with English-language Abstract.

\* cited by examiner

BIODEGRADABLE RESIN, BIODEGRADABLE RESIN COMPOSITION, BIODEGRADABLE MOLDED OBJECT, AND PROCESS FOR PRODUCING BIODEGRADABLE RESIN

TECHNOLOGICAL FIELD

The present invention relates to a resin and a resin composition, rendering material recycle easy by using a thermo-reversible cross-linking method, having excellent heat resistance and molding processability, and having biodegradability, and a method of producing them.

BACKGROUND TECHNOLOGY

Plastics are used in large amount in wide industrial fields because of excellent properties such as easy shaping, lightweight, cheapness, durability and the like. However, due to durability, even if used plastics are discarded into the natural world, these are not decomposed to cause an environmental problem, in some cases. Since used plastics are not permitted to be discarded into the natural world, they should be subjected to a burning treatment and the like after use, however, due to large heat generation in burning, there is a possibility of injuring a combustion furnace in burning, and dioxin is generated by burning, in some cases. Based on such facts, there is desired a biodegradable plastic which can be recycled and which is decomposed by a microorganism and the like when discarded into the natural world after use. Particularly, from the standpoint of reduction of production energy and decrease in discharge amount of carbon dioxide, a material-recyclable biodegradable plastic is more desired than a thermal-recyclable biodegradable plastic.

However, conventional biodegradable plastics are insufficient in properties such as heat resistance and the like as compared with general plastics, in some cases. Therefore, for the purpose of improving the properties of a biodegradable plastic, such as heat resistance and the like, Japanese Patent Application Laid-Open (JP-A) No. 6-192375 suggests a technology in which polycaprolactone is cross-linked with an isocyanate, and the heat resistance of a biodegradable plastic is improved by introducing a cross-linked structure of a covalent bond.

In the above-mentioned conventional technology, the heat resistance and the like of a biodegradable plastic are improved by a cross-linked structure, however, there are a possibility of decrease in flowability in heat melting, a possibility of insufficient moldability, and a possibility of decrease in biodegradability. Particularly, in the case of a highly cross-linked biodegradable plastic, when this is once molded, it behaves as if a thermosetting resin, and even if this is to be recovered and recycled, sufficient heat melting is not attained in second and later moldings, leading to difficult recycling, in some cases.

For the purpose of improving a recycling property, there is a suggestion on introduction of a thermo-reversible cross-linked structure with covalent bond into a plastic. First, as examples of a thermo-reversible reaction based on covalent bond, Engle et al., J. Macromol. Sci. Re. Macromol. Chem. Phys., vol. 33, no. C3, pp. 239 to 257, 1993 describes a Diels-Alder reaction, nitroso dimerization reaction, esterification reaction, ionene-forming reaction, urethane-forming reaction and azlactone-phenol addition reaction.

Nakane Yoshinori and Ishidoya Masahiro, et al., Shikizai (Coloring Material), vol. 67, No. 12, pp. 766 to 774, 1994; Nakane Yoshinori and Ishidoya Masahiro, et al., Shikizai (Coloring Material), vol. 69, No. 11, pp. 735 to 742, 1996; JP-A No. 11-35675, describe a thermo-reversible cross-linked structure utilizing a vinyl ether group.

Further, there are examples as described below for obtaining a recycling property utilizing a thermo-reversible cross-linked structure with covalent bond.

JP-A No. 7-247364 describes a method for separating and recovering an oligomer and chemically-recycling this, utilizing a reversibly cross-linkable oligomer, and describes, as a method of cleaving a cross-linked portion, a means for irradiation with ultraviolet ray and a means for cleaving by heat utilizing a Diels-Alder reaction. However, for conducting a cleaving reaction uniformly utilizing light, it is difficult for a molded article itself to secure transparency against light and it is necessary to dilute and dissolve the molded article in an organic solvent before the reaction, and this procedure has extremely poor efficiency as compared with a usual material recycle of resin by heat melting. According to Example 3 of this publication, a cleaving reaction by heat occurs at 90° C. This cleaving temperature is equal to or lower than the glass transition temperature (90 to 105° C.) of a resin (polyacrylate) as a mother material, rather deteriorating heat resistance. When intending improvement in sufficient heat resistance at 100° C. or more, it is necessary that a cross-linked portion cleaving reaction occurs at temperatures at least over 120° C. Therefore, it is necessary to select a reversible cross-linking portion having suitable cleaving reaction temperature and apply this to a resin.

Japanese Patent Application National Publication (Laid-Open) No. 10-508655 attains a recycling property by introducing 2,5-dialkyl-substituted furan into a resin. Introduction of furan is performed by a dehydration reaction of a copolymer of carbon monoxide with an olefin, with a strong acid. However, in the case a biodegradable resin, it is polymerized by an easily-hydrolyzable functional group such as an ester bond and the like. Introduction of a furan ring by such means is very difficult since decomposition of a resin is caused by this. The cleaving temperature of a cross-linked portion and the thermal stability of a diene depend significantly on the polarity and concentration of a reaction field. In the case of biodegradable resin, it is not necessary to limit the Diels-Alder reaction to those using 2,5-dialkyl-substituted furan.

Further, examples utilizing a reversible reaction by an esterification reaction of an acid anhydride for improvement in heat resistance and improvement in a recycling property are described in JP-A No. 11-106578, and the like, and a means is shown in which a carboxylic anhydride is introduced into a vinyl polymerization compound and cross-linked with a linker having a hydroxyl group. However, a lot of biodegradable resins have in the main chain a hydrolysable bond in which a carboxylic acid acts as a catalyst, such as an ester bond and the like. When the esterification reaction of an acid anhydride is introduced into a biodegradable resin, a free carboxylic acid is generated when a cross-linked portion has been formed, and the hydrolysis speed of a biodegradable resin as a mother material becomes remarkably high in preservation of a resin before molding and in use of a molded article, consequently, the moisture resistance and durability of the resin lower more than the necessity and the resin cannot be practically used.

On the other hand, in the case of a carboxy-alkenyloxy type, when a compound having a bond cleaving temperature of 120° C. or more is used, a free carboxylic acid is not generated easily at practical temperatures of 100° C. or less. When a resin is previously dried sufficiently in molding, hydrolysis does not occur and its durability is not deteriorated. Further, a nitroso dimer type, urethane type and azlactone-hydroxyaryl type are also applicable.

There is also an example of introduction of a thermo-reversible cross-linked structure by an electrostatic bond into a biodegradable resin. First, as examples of electrostatic bond, there are JP-A No. 2000-281805 and, Yano Shinichi, Ionomer no Bussei to Kougyouteki Ouyou (Physical Property and Industrial Application of Ionomer); M. R. Tant et al., Ionomers (ISBN: 0-7514-0392-X).

As an example utilizing a thermo-reversible cross-linked structure by an electrostatic bond in a biodegradable resin, JP-A No. 2000-281805 discloses an ion-crosslinked film obtained by cross-linking a carboxyl group of polysaccharides such as carboxymethylcellulose having a carboxyl group, carboxyl group-containing starch and the like with a poly-valent metal ion, for the purpose of improving strength. However, in general, an electrostatic bond is inferior in bonding strength to a covalent bond, consequently, heat resistance cannot be desired to be sufficiently improved, though the viscosity and elastic modulus of a resin are improved remarkably.

As described above, there are a lot of trials for realizing the recycling property of a resin material by introducing a thermo-reversible cross-linked structure with covalent bond in the resin material, however, there is few example applying this in a biodegradable resin material. It is technologically difficult to introduce a thermo-reversible cross-linked structure with covalent bond into a biodegradable resin material, and is has been difficult to realize practical properties with a recyclable biodegradable resin material.

SUMMARY OF THE INVENTION

In view of the above-mentioned conditions, the present invention has an object of providing a recyclable biodegradable resin material having practical properties by introducing a thermo-reversible cross-linked structure with covalent bond into a biodegradable resin material.

More specifically, the present invention has an object of providing a resin and a resin composition having sufficient heat resistance, molding property, recycling property and biodegradability.

According to the present invention for obtaining the above-mentioned object, a biodegradable resin is provided having a functional group forming a thermo-reversible cross-linked structure which is covalently bonded by cooling and cleaved by heating.

Further provided is a biodegradable resin composition comprising a first biodegradable resin having a first functional group forming a thermo-reversible cross-linked structure which is covalently bonded by cooling and cleaved by heating, and a second biodegradable resin having a second functional group forming a thermo-reversible cross-linked structure which is covalently bonded with the first functional group by cooling and cleaved by heating.

Furthermore provided is a biodegradable resin composition comprising a first biodegradable resin having a first functional group forming a thermo-reversible cross-linked structure which is covalently bonded by cooling and cleaved by heating, and a linker having a second functional group forming a thermo-reversible cross-linked structure which is covalently bonded with the first functional group by cooling and cleaved by heating.

Further provided is a method of producing a biodegradable resin comprising a step of reacting a cross-linking agent having a structure of the covalent bond of a first functional group and a second functional group, which is covalently bonded by cooling and cleaved by heating, and a third functional group, with a biodegradable resin material having a site reacting with the third functional group.

Even further provided is a method of producing a biodegradable resin comprising a step of cross-linking a first biodegradable resin having a first functional group forming a thermo-reversible cross-linked structure which is covalently bonded by cooling and cleaved by heating, with a linker having two or more second functional groups forming a thermo-reversible cross-linked structure which is covalently bonded with the first functional group by cooling and cleaved by heating.

The cross-linked structure of a biodegradable resin having a thermo-reversible cross-linked structure is cleaved in melt molding. Accordingly, even if a portion composed of cross-linked structures in a number necessary for rendering properties such as heat resistance and the like sufficient is introduced, viscosity is suitable in melting and excellent molding processability can be realized. Even if this is molded once, the molded body does not behave like a thermo-setting resin, and when this is recovered and recycled, it can be thermally-melted sufficiently even in second or later moldings, realizing an excellent recycling property. Further, since it is solidified in cooling to again form a cross-linked structure, the molded body has sufficient heat resistance.

Particularly, since a covalently bondable thermo-reversible cross-linked structure has suitable bonding force as compared with a thermo-reversible cross-linked structure by electrostatic bond, if this is introduced into a biodegradable material, heat resistance and strength and the like which are inferior in conventional biodegradable resin material can be improved due to the cross-linked structure under use environments while the cross-linked structure is cleaved to secure high flowability in molding at high temperatures.

In the case of thermo-reversible cross-linked structure, after cleavage of a cross-linked structure at high temperatures, the cross-linked structure is again formed by a cooling operation conducted subsequently. Therefore, the cleaving and re-formation of a cross-linked structure can be repeated for any times by temperature changing. By introducing such a cross-linked structure into a biodegradable resin material, an excellent resin and resin composition can be obtained. Namely, at temperatures for use of a molded body such as normal temperature and the like, it is possible to form a super-cross-linked structure to improve heat resistance and strength, and at temperatures equal to or higher than the melting point such as molding temperature and the like, a cross-linked structure is lost and the molecular weight of the resin lowers, consequently, flowability increases, and a molding property and material recycling property can be improved.

The molded body, when solidified, contains mainly a resin cross-linked by covalent bond, and when melted, the cross-linked portions is cleaved, therefore, a composition containing two or more resins is obtained, or a composition containing a resin and a linker is obtained, in some cases. Therefore, when it is not necessary to specially distinguish a resin and a resin composition, there are also referred to as resin substance.

Further high performance and wide physical properties can be realized by introducing an electrostatic bondable thermo-reversible cross-linked structure into a biodegradable resin, in addition to covalently bondable thermo-reversible cross-linked structure. Specific examples thereof include a method in which a functional group forming a covalently bondable cross-linked structure and a functional group forming a cross-linked structure with electrostatically bonding are introduced into the same biodegradable resin material; a method in which a biodegradable resin material containing an introduced functional group forming a covalently bondable cross-linked structure and biodegradable resin material containing an introduced functional group forming a cross-linked structure with electrostatically bonding are mixed; a method in which a functional group forming a cross-linked structure having both a covalent binding and an electrostatic bonding is introduced; and the like.

A cross-linked structure with electrostatically bonding is biodegraded quickly when buried in soil and the like in the presence of water.

As a result, a covalently bondable thermo-reversible cross-linked structure can be introduced into a biodegradable resin material, and practical properties can be realized in a recyclable biodegradable resin material.

Consequently, a resin and a resin composition having sufficient heat resistance, molding property, recycling property and biodegradability can be realized.

Additionally, heat resistance, molding property, recycling property and biodegradability can be further improved by carefully selecting the kind of a biodegradable resin material, setting the cleaving temperature of a cross-linked structure in given range, carefully selecting the kind of a cross-linked structure, and making a three-dimensional cross-linked structure.

BEST MODES FOR CARRYING OUT THE INVENTION

The present invention will be illustrated in detail below.
(Biodegradable Resin Material)
The biodegradable resin material as a raw material of a biodegradable resin is selected while sufficiently considering the nature of a functional group introduced to form a thermo-reversible cross-linked structure.

As such a biodegradable resin material, there are biodegradable monomers, oligomers and polymers which are mainly artificially synthesized and available; derivatives of biodegradable monomers, modified bodies of biodegradable oligomers and modified bodies of biodegradable polymers which are mainly artificially synthesized and available; biodegradable monomers, oligomers and polymers which are mainly naturally synthesized and available; derivatives of biodegradable monomers, modified bodies of biodegradable oligomers and modified bodies of biodegradable polymers which are mainly naturally synthesized and available; and the like.

Examples of the artificially synthesized biodegradable oligomer and polymer include poly-α-hydroxy acids such as polylactic acid (manufactured by Shimadzu Corp., trade name: Lacty, and the like), polyglycolic acid and the like, polyesters such as poly-ω-hydroxyalkanoate such as poly-ε-caprolactone and the like (manufactured by Daicel Chemical Industries, Ltd., trade name: Plaxel, and the like), polyalkylene alkanoates as a polymer of butylenes succinate and/or ethylene succinate (manufactured by Showa Kobunshi K.K., trade name: Bionole, and the like), polybutylene succinate and the like, polyamino acids such as poly-γ-glutamate (manufactured by Ajinomoto Co., Inc., trade name: Polyglutamic acid, and the like) and the like, polyols such as polyvinyl alcohol, polyethylene glycol and the like.

Modified bodies of these artificially synthesized biodegradable oligomers and polymers can also be suitably used.

The naturally synthesized biodegradable oligomers and polymers include polysaccharides such as starch, amylose, cellulose, cellulose ester, chitin, chitosan, Guerin gum, carboxyl group-containing cellulose, carboxyl group-containing starch, pectinic acid, alginic acid and the like; poly-β-hydroxy alkanoates as a polymer of hydroxy butyrate and/or hydroxy valerate synthesized with a microorganism (manufactured by Zeneca, trade name: Biopole, and the like) and the like, and of them, preferable are starch, amylose, cellulose, cellulose ester, chitin, chitosan, poly-β-hydroxy alkanoates as a polymer of hydroxy butyrate and/or hydroxy valerate synthesized with a microorganism, and the like.

Modified bodies of naturally synthesized biodegradable oligomers and polymers can also be suitably used.

As the modified bodies of naturally synthesized biodegradable oligomers and polymers, lignin and the like can be used. Lignin is a dehydrogenated polymer of coniferyl alcohol and sinapyl alcohol contained in a proportion of 20 to 30% in wood, and biodegraded.

Among the biodegradable resin materials as described above, artificially synthesized biodegradable oligomers and polymers and modified bodies of artificially synthesized biodegradable oligomers and polymer have suitable bonding force between molecules, resultantly, thermoplasticity thereof is excellent, the viscosity in melting does not increase remarkably, and molding processability thereof is excellent, preferably.

Of them, polyesters and modified bodies of polyesters are preferable, and aliphatic polyesters and modified bodies of aliphatic polyesters are further preferable. Further, polyamino acids and modified bodies of polyamino acids are preferable, and aliphatic polyamino acids and modified bodies of aliphatic polyamino acids are further preferable. Furthermore, polyols and modified bodies of polyols are preferable, and aliphatic polyols and modified bodies of aliphatic polyols are further preferable.

The number-average molecular weight of a raw material biodegradable resin is, from the standpoint of the abilities of the resulting biodegradable resin (processability, heat resistance of molded body, mechanical property of molded body, and the like), preferably 100 or more and preferably 1000000 or less, more preferably 500000 or less, further preferably 100000 or less, most preferably 10000 or less.

By introducing a functional group forming a thermo-reversible cross-linked structure into the biodegradable resin materials, derivatives thereof or modified bodies thereof, a thermo-reversible cross-linkable biodegradable resin can be produced.

A functional group necessary for thermo-reversible cross-linking may be introduced to the end of a molecule chain of a biodegradable resin material or into a molecule chain. As the method for introduction, addition reaction, condensation reaction, copolymerization reaction and the like can be used. Many biodegradable resin materials have functional groups such as a hydroxyl group, carboxyl group, amino group and the like. Therefore, these functional groups can be directly utilized as a thermo-reversible cross-linked portion, or these functional groups can be derived into a functional group forming thermo-reversible cross-linking.

For example, when a hydroxyl group is necessary, the following methods are possible.

(i) Polysaccharides and polyols have already a hydroxyl group.

(ii) Polyesters have a hydroxyl group and/or carboxyl group at the end of a molecule chain. As polyesters carrying a hydroxyl group at both ends of a molecule chain, for example, both end-hydroxy PBS (polybutylene succinate) is mentioned. The both end-hydroxy PBS can be obtained by, for example, charging 1,4-butanediol and succinic acid so that the 1,4-butanediol/succinic acid (molar ratio) is preferably more than 1, more preferably 1.05 or more, further preferably 1.1 or more, and conducting a dehydration condensation reaction.

(iii) On the other hand, regarding polyesters having a carboxyl group at the end of a molecule chain, the carboxyl group can be sealed with a hydroxyl group to obtain polyesters having a hydroxyl group at both ends. As the compound used for sealing, those having two or more hydroxyl groups such as diols and polyols are desirable, and it is particularly desirable to use a compound having three or more hydroxyl groups since then a cross-linked point of three-dimensional cross-linked structure can be formed. For example, by esterifying a carboxyl group of polylactic acid obtained by ring-opening polymerization of lactide, with pentaerythritol to seal the carboxyl group, a polyester having a hydroxyl group at both ends of a molecule is obtained. "Sealing with a hydroxyl group" means that, for example, the end is derived into a hydroxyl group.

(iv) It is also possible to prepare a polyester having a hydroxyl group at the end, by sequentially adding lactide by ring-opening polymerization to a poly-functional hydroxyl compound as a core, according to a method of Chan-Ming D. et al. (Polymer, vol. 42, p. 6891, 2001).

In an esterification reaction, reagents such as carbodiimides and the like can also be used in addition to acids and alkalis. Esterification can also be performed by converting a carboxyl group into an acid chloride using thionyl chloride or allyl chloride, then, reacting this with a hydroxyl group. Regarding those synthesized by using as a raw material a dicarboxylic acid and diol such as polybutylene succinate, polyethylene succinate and polybutylene succinate adipate, end groups of a molecular chain can all be converted into a hydroxyl group by setting a molar ratio of diol/dicarboxylic acid of raw materials used of more than 1.

By a transesterification reaction, the end group can be converted into a hydroxyl group. Namely, a polyester resin can be transesterified with a compound having two or more hydroxyl groups, to obtain a polyester resin having a hydroxyl group at the end.

It is particularly desirable to use a compound having three or more hydroxyl groups, as the compound having a hydroxyl group, since then a cross-linking point of a three-dimensional cross-linked structure can be formed. For example, by transesterifying an ester bond of polylactic acid with pentaerythritol, a polyester having 4 hydroxyl groups in total at the end of a molecule chain is obtained. A resin having a carboxylic acid at the end part and a compound having an unreacted hydroxyl group can be easily purified and removed.

When a biodegradable resin material or a biodegradable resin material modified with a hydroxyl group is subjected to an esterification reaction with hydroxybenzoic acid, a hydroxyl group can be converted into a phenolic hydroxyl group.

When a carboxyl group is necessary, if a compound having a 2 or more-functional carboxylic acid is bonded to a hydroxyl group carried on a biodegradable resin material by the above-mentioned transesterification reaction, it can be modified into a carboxyl group. Particularly when an acid anhydride is used, a biodegradable resin material having a carboxyl group can be easily prepared. As the acid anhydride, pyromellitic anhydride, trimellitic anhydride, phthalic anhydride, hexahydrophthalic anhydride, maleic anhydride and derivatives thereof can be utilized.

(Chemical Structure of Cross-Linked Portion)

The cross-linked portion cosists of two groups, a first functional group and a second functional group, manifesting cleaving by heating and covalent bonding by cooling. When solidified at temperatures lower than the melt processing temperature, a first functional group and a second functional group form cross-linking by a covalent bond, and at given temperatures equal to or higher than the melt processing temperature and the like, cleavage into a first functional group and a second functional group occurs. The bonding reaction and cleaving reaction of a cross-linked portion progress reversibly with the change in temperature. A first functional group and a second functional group may be different functional groups or the same functional group. When the same two functional groups are symmetrically bonded to form cross-linking, the same functional group can be used as the first functional group and the second functional group.

The reversible reaction mode for bonding by heating to form a cross-linked portion and cleaving by cooling is not particularly restricted, and desirably selected from the following modes, from the standpoint of the productivity of a resin substance, the molding property of a resin substance, the abilities of a molded body (mechanical properties and heat resistance and the like) and the like.

(1) Diels-Alder Type Cross-Linking

A Diels-Alder [4+2] cycloaddition is utilized. By introducing a conjugated diene and dienophile as a functional group, a biodegradable resin forming thermo-reversible cross-linking is obtained. As the conjugated diene, for example, a furan ring, thiophene ring, pyrrole ring, cyclopentadiene ring, 1,3-butadiene, thiophene-1-oxide ring, thiophene-1,1-dioxide ring, cyclopenta-2,4-dienone ring, 2H pyrane ring, cyclohexa-1,3-diene ring, 2H pyrane-1-oxide ring, 1,2-dihydropyridine ring, 2H thiopyrane-1,1-dioxide ring, cyclohexa-2,4-dienone ring, pyran-2-one ring and the substituted bodies of them, and the like can be used as a functional group. As the dienophile, an unsaturated compound reacting additively with a conjugated diene to give a cyclic compound is used. For example, a vinyl group, acetylene group, allyl group, diazo group, nitro group and substituted bodies thereof are used as a functional group. The above-mentioned conjugated diene also acts as a dienophile, in some cases.

Of them, for example, cyclopentadiene can be used in a cross-linking reaction. Cyclopentadiene has both the action as a conjugated diene and the action as a dienophile. Dicyclopentadienedicarboxylic acid as a dimer of cyclopentadiene carboxylic acid can be obtained easily from commercially available cyclopentadienyl sodium (E. Rukcenstein et al., J. Polym. Sci. Part A: Polym. Chem., vol. 38, pp. 818 to 825, 2000). This dicyclopentadienedicarboxylic acid is introduced as a cross-linking portion into a biodegradable resin material having a hydroxyl group or a biodegradable resin material modified with a hydroxyl group and the like, at a site of the presence of a hydroxyl group, by an esterification reaction.

When 3-maleimidepropionic acid and 3-furylpropionic acid are, for example, used, a cross-linking portion can be introduced easily into a biodegradable resin material having a hydroxyl group or a biodegradable resin material modified with a hydroxyl group and the like, at a site of presence of a hydroxyl group, by an esterification reaction.

In the above-mentioned esterification reaction utilized for introduction of a cross-linking portion, catalysts such as carbodiimides and the like can also be used in addition to acids and alkalis and the like. It is also possible that a carboxyl group is derived into an acid chloride using thionyl chloride or allyl chloride and the like, then, this is reacted with a hydroxyl group to cause esterification. When an acid chloride is used, it can also be introduced at the side of an amino group of amino acids and derivatives thereof since it easily reacts also with an amino group.

These functional groups form a thermo-reversible cross-linked structure as shown in the following general formula (I).

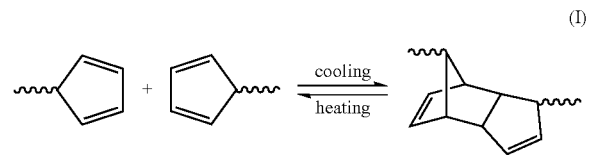
(I)

(2) Nitroso Dimer Type Cross-Linking

Nitrosobenzene, for example, is used in a cross-linking reaction. As the nitrosobenzene, for example, dinitrosopropane, dinitrosohexane, dinitrosobenzene, dinitrosotoluene and the like are used. For example, by reacting a dimer of 4-nitroso-3,5-benzylic acid (a method of synthesizing a dimer of 4-nitroso-3,5-dichlorobenzoyl chloride is described in U.S. Pat. No. 3,872,057) with a hydroxyl group of a biodegradable resin material having a hydroxyl group, a hydroxyl group of a biodegradable resin material modified with a hydroxyl group, and the like, a thermo-reversible cross-linked portion can be easily introduced into a portion of the presence of a hydroxyl group. When an acid anhydride is used, it can also be introduced at the side of an amino group of amino acids and derivatives thereof since it easily reacts also with an amino group.

These functional groups form a thermo-reversible cross-linked structure as shown in the following general formula (II).

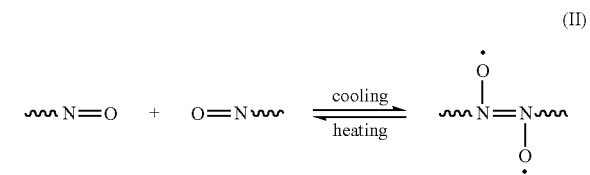
(II)

In the general formula (II), two nitroso groups form a nitroso dimer by cooling to give cross-linking. This cross-linked portion is cleaved by heating.

(3) Acid Anhydride Ester Type Cross-Linking

An acid anhydride and a hydroxyl group can be used in a cross-linking reaction. As the acid anhydride, an aliphatic carboxylic anhydride and an aromatic carboxylic anhydride and the like are used. Though any of cyclic acid anhydrides and acyclic acid anhydrides can be used, cyclic acid anhydrides are suitably used. Examples of the cyclic acid anhydride include a maleic anhydride group, phthalic anhydric group, succinic anhydride group and glutaric anhydride group, and examples of the acyclic acid anhydride include an acetic anhydride group, propionic anhydride group and benzoic anhydride group. Of them, a maleic anhydride group, phthalic anhydric group, succinic anhydride group, glutaric anhydride group, pyromellitic anhydride group, trimellitic anhydride group, hexahydrophthalic anhydride group, acetic anhydride group, propionic anhydride group and benzoic anhydride group and substituted bodies thereof and the like are preferable as the acid anhydride reacting with a hydroxyl group to form a cross-linked structure.

As the hydroxyl group, a hydroxyl group of a biodegradable resin material having a hydroxyl group, and a hydroxyl group of a biodegradable resin material and the like containing a hydroxyl group introduced by various reactions, are used. Also, hydroxyl compounds such as diols and polyols and the like may be used as a cross-linking agent. Further, diamines and polyamines can also be used as a cross-linking agent. When those having two or more acid anhydrides such as pyromellitic anhydride are, for example, used as the acid anhydride, they can be used as a cross-linking agent for a biodegradable resin material having a hydroxyl group, a biodegradable resin material modified with a hydroxyl group.

By copolymerizing maleic anhydride with an unsaturated compound by vinyl polymerization, a compound having two or more maleic anhydrides is obtained easily (JP-A Nos. 11-106578, 2000-34376). This can also be used as a cross-linking agent for a biodegradable resin material having a hydroxyl group, a biodegradable resin material modified with a hydroxyl group.

The acid anhydride and hydroxyl group as described above form a thermo-reversible cross-linked structure as shown in the following general formula (III).

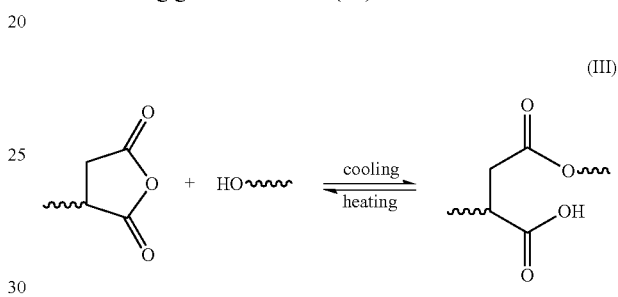
(III)

In the general formula (III), an acid anhydride group and a hydroxyl group form an ester by cooling to give cross-linking. This cross-linking is cleaved by heating.

(4) Halogen-Amine Type Cross-Linking

A thermo-reversible cross-linked portion can be formed from a polyamine and tetramethylhexadiamine and the like and an alkyl halide. For example, a halide can be obtained by ester-bonding a halide having a carboxyl group such as 4-bromomethylbenzoic acid to a biodegradable resin material having a hydroxyl group or a biodegradable resin material modified with a hydroxyl group, and the like. By adding, for example, tetramethylhexanediamine as a cross-linking agent to this, a biodegradable resin forming thermo-reversible cross-linking is obtained.

Examples of the alkyl halide group include an alkyl bromide, alkyl chloride, phenyl bromide, phenyl chloride, benzyl bromide and benzyl chloride.

As the amino group, tertiary amino groups are preferable, and examples thereof include a dimethylamino group, diethylamino group and diphenylamino group. Of them, a dimethylamino group is preferable. The combination of an alkyl halide with a tertiary amino group is not particularly restricted, and a combination of benzyl bromide with dimethylamino group is exemplified.

These functional groups form a thermo-reversible cross-linked structure as shown in the following general formula (IV).

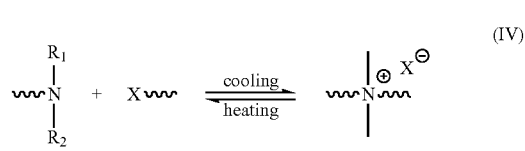
(IV)

In the general formula (IV), an alkyl halide group and a tertiary amine group form a covalent bond of quaternary ammonium salt type, to give cross-linking. This cross-linking is cleaved by heating.

(5) Urethane Type Cross-Linking

A thermo-reversible cross-linked portion can be formed from an isocyanate and active hydrogen. For example, a multi-functional isocyanate is used as a cross-linking agent, and is reacted with a hydroxyl group, amino group and phenolic hydroxyl group of biodegradable resin materials and derivatives thereof. A molecule having two or more functional groups selected from a hydroxyl group, amino group and phenolic hydroxyl group can also be added as a cross-linking agent. Further, a catalyst can also be added for setting the cleaving temperature in a desired range. Further, dihydroxybenzene, dihydroxybiphenyl, phenol resin and the like can also be added as a cross-linking agent.

A multi-functional isocyanate is used as a cross-linking agent, and is reacted with a hydroxyl group, amino group and phenolic hydroxyl group of biodegradable resin materials and derivatives thereof. Further, dihydroxybenzene, dihydroxybiphenyl, phenol resin and the like can also be added as a cross-linking agent. As the multi-functional isocyanate, there can be used tolylene diisocyanate (TDI) and polymerized body thereof, 4,4'-diphenylmethane diisocyanate (MDI), hexamethylene diisocyanate (HMDI), 1,4-phenylene diisocyanate (DPDI), 1,3-phenylene diisocyanate, 4,4',4"-triphenylmethane triisocyanate, xylylene diisocyanate and the like.

For controlling the cleaving temperature, organic compounds such as 1,3-diacetoxytetrabutyl distanoxane and the like, amines, metal soaps and the like may also be used as a cleaving catalyst.

The above-mentioned functional groups form a thermo-reversible cross-linked structure as shown in the following general formula (V).

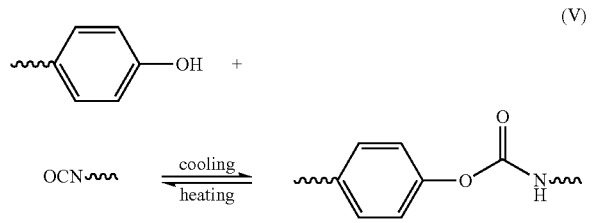

(V)

In the general formula (V), a phenolic hydroxyl group and an isocyanate group form a urethane by cooling to give cross-linking. This cross-linking is cleaved by heating.

(6) Azlactone-Hydroxyaryl Type Cross-Linking

Examples of the aryl group include a phenyl group, tolyl group, xylyl group, biphenyl group, naphthyl group, anthryl group, phenanethryl group and groups derived from these groups, and a phenolic hydroxyl group bonding to these groups reacts with an azlactone structure contained in a group forming a cross-linked structure. As that having a phenolic hydroxyl group, used are biodegradable resin materials having a phenolic hydroxyl group, biodegradable resin materials modified with hydroxylphenols, and the like.

As the azlactone structure, multi-functional aziactones such as 1,4-(4,4'-dimethylazlactyl)butane, poly(2-vinyl-4,4'-dimethylazlactone), bisazlactonebenzene, bisazlactonehexane and the like are preferable.

Bisaziactylbutane cross-linked by an azlactone-phenol reaction, and the like can also be used, and these are described, for example, Engle et al., J. Macromol. Sci. Re. Macromol. Chem. Phys., vol. C33, no. 3, pp. 239 to 257, 1993.

These functional groups form a thermo-reversible cross-linked structure as shown in the following general formula (VI).

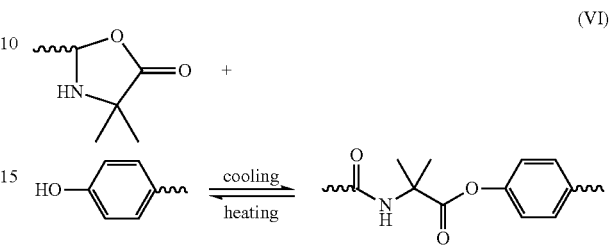

(VI)

In the general formula (VI), an azlactone group and a phenolic hydroxyl group form a covalent bond by cooling to give cross-linking. This cross-linking is cleaved by heating.

(7) Carboxyl-Alkenyloxy Type Cross-Linking

As that having a carboxyl group, biodegradable resin materials having a carboxyl group, biodegradable resin materials modified with a carboxyl group, and the like are used. The alkenyloxy structure includes vinyl ether, allyl ether and structures derived from these structures, and those having two or more alkenyloxy structures can also be used.

Further, alkenyl ether derivatives such as bis[4-(vinyloxy)butyl] adipate and bis[4-(vinyloxy)butyl] succinate and the like can also be used as a cross-linking agent.

These functional groups form a thermo-reversible cross-linked structure as shown in the following general formula (VII).

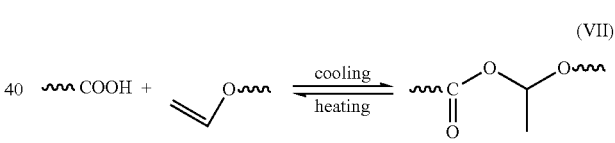

(VII)

In the general formula (VII), a carboxyl group and a vinyl ether group form a hemiacetal ester by cooling to give cross-linking. This cross-linking is cleaved by heating (JP-A Nos. 11-35675, 60-179479).

(8) Cross-Linking Agent

As described above, a compound having in its molecule two or more functional groups capable of forming a thermo-reversible cross-linked portion can be a cross-linking agent.

Examples of the cross-linking agent having an acid anhydride group include bisphthalic anhydride compound, bissuccinic anhydride compound, bisglutaric anhydride compound and bismaleic anhydride compound.

Examples of the cross-linking agent having a hydroxyl group include glycols such as ethylene glycol, diethylene glycol, triethylene glycol and the like; and alcohol compounds such as 1,4-butanediol, 1,6-hexaneidol, 1,8-octanediol, 1,10-decanediol, trimethylolethane, trimethylolpropane, pentaerythritol and the like.

Examples of the cross-linking agent having a carboxyl group include oxalic acid, malonic acid, succinic acid, glutaric acid, adipic acid, phthalic acid, maleic acid and fumaric acid.

Examples of the cross-linking agent having a vinyl ether group include bis[4-(vinyloxy)butyl] adipate, bis[4-(vinyloxy)butyl] succinate, ethylene glycol divinyl ether, butanediol divinyl ether, 2,2-vis[p-(2-vinyloxyethoxy)phenyl]propane.

Examples of the cross-linking agent having an alky halide group include α,α'-dibromoxylene, α,α'-dichloroxylene, bis-bromomethylbiphenyl, bischloromethylbiphenyl, bisbromodiphenylmethane, bischlorodiphenylmethane, bisbromomethylbenzophenone, bischloromethylbenzophenone, bisbromodiphenylpropane and bischlorodiphenylpropane.

Examples of the cross-linking agent having a tertiary amino group include tetramethylethylenediamine, tetramethylhexanediamine and bisdimethylaminobenzene.

Examples of the cross-linking agent having a phenolic hydroxyl group include dihydroxybenzene, dihydroxybiphenyl, resol type phenol resin and novolak type phenol resin.

Examples of the cross-linking agent having an isocyanate group include aromatic diisocyanates such as 2,4-tolylene diisocyanate, 2,6-tolylene diisocyanate, 4,4'-diphenylmethane diisocyanate, 2,4'-diphenylmethane diisocyanate, p-phenylene diisocyanate and the like, aliphatic diisocyanates such as hexamethylene diisocyanate and the like, alicyclic diisocyanates such as isophorone diisocyanate and the like, and arylaliphatic diisocyanates such as xylylene diisocyanate and the like.

Examples of the cross-linking agent having an azlactone group include bisazlactonebutane, bisazlactonebenzene and bisazlactonehexane.

Examples of the cross-linking agent having a nitroso group include dinitrosopropane, dinitrosohexane, dinitrosobenzene and dinitrosotoluene.

(Selection of Cross-Linked Structure)

As the mode of a reversible reaction of bonding by heating to form a cross-linked portion and cleaving by cooling, a Diels-Alder type, nitroso dimer type, acid anhydride ester type, halogen-amine type, urethane type, azlactone-hydroxyaryl type and carboxyl-alkenyloxy type and the like can be utilized as described above, however, it may be advantageous to avoid a chemical reaction showing deterioration of the main chain of a biodegradable resin by thermal decomposition, hydrolysis and the like, in some cases. Particularly, it may be advantageous to avoid a reaction generating a free carboxylic acid, in forming a cross-linked structure such as of acid anhydride ester type. However, when biodegradation speed is desired to be increased, a reaction generating a carboxylic acid may rather be preferable, in some cases. In the case of a halogen-amine type reaction, there is a possibility of generation of dioxins in burning since a halogen is contained. In any way, it is necessary to effect the selection of the reaction type carefully.

The cleaving temperature of a cross-linked portion is preferably over 120° C. since sufficient cross-linking is formed at the use temperatures of a molded body of 100° C. or less. On the other hand, temperatures of 280° C. or less are preferable and temperatures of 250° C. or less are more preferable since then melt processing can be conducted at suitable temperatures, from the standpoint of thermal decomposition of a biodegradable resin substance.

More specifically, a biodegradable resin is provided having a functional group forming a thermo-reversible cross-linked structure which is covalently bonded at temperatures for use as a molded article and cleaved at temperatures over the glass transition temperature (Tg), temperatures over heat resistant temperature necessary for a resin, and temperatures equal to or lower than the molding temperature.

Temperatures over the glass transition temperature (Tg) and temperatures over heat resistant temperature necessary for a resin include, for example, 120° C., and at 120° C. or higher, the degradation of a biodegradable resin is not promoted, the cross-linked structure can be selected from a Diels-Alder type, carboxyl-alkenyloxy type and the like, and a nitroso dimer type, urethane type, azlactone-hydroxyaryl type and the like can also be applied.

In the case of the Diels-Alder type, the cleaving reaction of dicyclopentane progresses at 150° C. or more and 250° C. or less, therefore, it is possible to impart high heat resistance and excellent molding property to a biodegradable resin. Regarding this cleaving temperature of a cross-linked portion, for example, Chujo et al., macromolecules, vol. 23, pp. 2636-2641, 1990 introduces that the cleaving temperature of a cleaving reaction in a solution is 80° C., in a reaction of furan-maleimide. On the other hand, Stephen A. C et al. (J. P. S. Part A: Polym. Chem., vol. 30, p. 1775, (1992)) introduces the existence of those showing the maximum cleaving reaction at 150° C. and those showing the maximum cleaving reaction at 210° C., and describes that the initiation temperature of a cleaving reaction varies significantly depending on the method for introducing a functional group since the degree of steric hindrance varies depending on this introduction method. As the method of stabilizing a bonding portion and raising the cleaving temperature, there are a method in which an electron attractive functional group is imparted to a maleimide ring, and a method in which an electron donative functional group is imparted to a furan ring. By this, the bonding reaction can be made easy, and a cross-linked portion having high cleaving temperature and having excellent heat resistance can also be obtained.

Since the cleaving reaction of nitroso dimer type cross-linking progresses at 110° C. or more and 150° C. or less, this reaction can provide high heat resistance and excellent molding property for a biodegradable resin.

Since the cleaving reaction of urethane type cross-linking progresses at 120° C. or more and 250° C. or less depending on the above-mentioned selection of a catalyst and control of addition amount, this reaction can provide high heat resistance and excellent molding property for a biodegradable resin.

Since the cleaving reaction of azlactone-hydroxyaryl type cross-linking progresses at 100° C. or more and 200° C. or less, this reaction can provide high heat resistance and excellent molding property for a biodegradable resin.

A free carboxylic acid is not present at normal temperature in a resin cross-linked by carboxyl-alkenyloxy type cross-linking, consequently, the moisture resistance of a biodegradable resin is not deteriorated, therefore, such as resin is preferable. Since the cleaving reaction of carboxyl-alkenyloxy type cross-linking progresses at 100° C. or more and 250° C. or less for a carboxyl group, this reaction can provide high heat resistance and excellent molding property for a biodegradable resin.

Of the above-mentioned types, the Diels-Alder type and carboxyl-alkenyloxy type are preferable since deterioration of a biodegradable resin is little and moisture resistance thereof is high, and preferable as the functional group are a hydroxyl group, carboxyl group, alkenyl group, alkenyloxy group, and a group having a conjugated double bond.

From the standpoint of heat resistance, preferable as the cross-linked structure is a three-dimensional cross-linked structure.

The cross-linked density of a three-dimensional cross-linked structure is set at a desired value by controlling the number of functional groups of a biodegradable resin and the mixing ratio of members and the like at given values. The cross-linked density of a three-dimensional cross-linked structure is represented by the mol number of cross-linking points of a three-dimensional structure contained per 100 g of a resin substance, and for realizing sufficient heat resistance, preferably 0.0001 or more, more preferably 0.001 or more, further preferably 0.002 or more, on the other hand, when the mol number of cross-linking portions is over 10, the number of portions forming a biodegradable resin increases larger than the number of portions forming cross-linked portions, and the viscosity in molding lowers, resultantly, an excellent molded article cannot be obtained. The mol number is preferably 1 or less, further preferably 0.2 or less for realizing a recycling property and biodegradability, since biodegradability is not shown outside this range.

(Structure of Cross-Linked Body)

At least any one of the functional groups as described above is contained in a first biodegradable resin, and in some cases, two or more first functional groups and two or more second functional groups are contained in a first biodegradable resin.

A first functional group is present at the end of a molecule of a first biodegradable resin in some cases and present at parts other than the end such as a side chain and the like in some cases. For example, when a first functional group is a hydroxyl group, polybutylene succinate having a hydroxyl group at both ends is an example of a first biodegradable resin having a first functional group present at the end. In this case, a first functional group is present on both ends of a first biodegradable resin, however, in some cases, a first functional group is present only at one end.

When a first functional group is a hydroxyl group, amylose and cellulose methylated at both ends are examples of a first biodegradable resin having a first functional group at parts other than the end.

The main chain of a first biodegradable resin may be linear or branched, for example, an ester body in which 4 mols of polylactic acid are radially bonded around the center composed of 1 mol of pentaerythritol is an example of a branched first biodegradable resin. When a first functional group is present at the end, a functional group is present on all ends in some cases, and a first functional group is present only at some ends in some cases.

Further, there is also a case in which a plurality of first functional groups are bonded to the same site in the molecule chain of a first biodegradable resin, and for example, when pentaerythritol is ester-bonded to the end of a carboxyl group of polylactic acid, this is an example in which three hydroxyl groups are bonded to the end of a carboxyl group of polylactic acid. In this case, carbon derived from central methane of pentaerythritol is situated at the same site, and a hydroxyl group as a first functional group is bonded to this carbon via methylene. That a plurality of first functional groups are bonded to the same site means that a plurality of first functional groups are bonded via 0 to 5 atoms counted from one atom, and from the standpoint of the abilities of the resulting thermo-reversible cross-linkable biodegradable resin, it is preferable that a plurality of first functional groups are bonded via 0 to 3 atoms.

From the standpoint of the productivity of a resin substance and the molding property of a resin substance, and the like, a first biodegradable resin having a first functional group present at the end of the molecule chain is preferable. In this case, since there exists suitable mutual action between first functional groups on different molecule chains in melt processing, excellent flowability and processability can be realized. From the standpoint of the abilities of a molded body (mechanical property, heat resistance and the like), preferable are a branched first biodegradable resin and a first biodegradable resin in which a plurality of first functional groups are bonded to the same site. In this case, since three-dimensional cross-linking is formed in a molded body, a molded body having excellent mechanical property and heat resistance can be obtained.

When there are two or more covalent-bondable functional groups, there are also a case in which other functional group (second functional group) is present in a biodegradable resin (first biodegradable resin) containing one functional group (first functional group) present therein, and a case in which a second functional group is present in a biodegradable resin (second biodegradable resin) other than a biodegradable resin (first biodegradable resin) containing a first functional group present therein. Examples in which both a first functional group and a second functional group are present in the same first biodegradable resin will be listed below.

(1) A multi-functional carboxylic acid resin in which a hydroxyl group of amylose and cellulose forms an ester bond with maleic anhydride is prepared. To part of carboxylic acids in this resin, 2-aminoethyl vinyl ether is ester-bonded via carbodiimides. In this case, a carboxylic acid structure (first functional group) and a vinyl ether group (second functional group) are present in the same biodegradable resin (first biodegradable resin), to form cross-linking of a carboxyl-alkenyloxy type.

(2) In the case of a first biodegradable resin in which a Diels-Alder reaction production of cyclopentadiene carboxylic acid and maleimide (3,5-dioxo-4-aza-tricyclo[5.2.1.02,6] deca-8-ene-10-carboxylic acid) is further ester-bonded four hydroxyl groups on both ends in a compound containing pentaerythritol ester-bonded to the end of a carboxyl group of polylactic acid, a first functional group and a second functional group are the identical cyclopentadiene derivative, a first functional group and a second functional group are presents in the same first biodegradable resin, and by removing maleimide by heating under reduced pressure, Diels-Alder type cross-linking composed of cyclopentadienes is formed. Cross-linking is formed at both ends of a first biodegradable resin.

(3) In the case of a first biodegradable resin in which cyclopentadiene carboxylic acid is ester-bonded to both ends of polybutylene succinate having a hydroxyl group at both ends, a first functional group and a second functional group are the identical cyclopenta-2,4-dien-1-yl group, a first functional group and a second functional group are presents in the same first biodegradable resin, and Diels-Alder type cross-linking is formed. Cross-linking is formed at both ends of the molecule chain of a first biodegradable resin.

(4) In the case of a first biodegradable resin in which nitrosobenzoic acid is ester-bonded to both ends of polybutylene succinate having a hydroxyl group at both ends, a first functional group and a second functional group are the identical nitrosobenzoyl group, a first functional group and a second functional group are presents in the same first biodegradable resin, and nitroso dimer type cross-linking is formed. Cross-linking is formed at both ends of a first biodegradable resin.

The above-mentioned resin substances (1) and (2) are obtained by introducing a first functional group and a second functional group into a first biodegradable resin material.

In producing the above-mentioned resin substances (3) and (4), a compound in which a first functional group and a second functional group forming a cross-linked portion are previously covalently bonded, and having a group reacting with a first biodegradable resin material in addition to the first functional group and second functional group (for example, dimer of dicyclopentadienedicarboxylic acid, nitrosobenzoic acid, and the like) can be used as a cross-linking agent. When such a cross-linking agent and a first biodegradable resin material are mixed and reacted to allow the cross-linking agent to bond to the first biodegradable resin material, a resin substance having a portion under cross-linked condition can be obtained with good productivity. Particularly, when a first functional group and a second functional group are identical and the identical functional groups symmetrically bond to form a cross-linked portion as in the above-mentioned (3) and (4), a dimer containing functional groups symmetrically bonded such as dicyclopentadienedicarboxylic acid, dimer of nitrosobenzoic acid and the like can be used as a cross-linking agent.

When a cross-linking agent contains a plurality of functional groups, if the functional groups are identical, production of a cross-linking agent is easy, and a cross-linking reaction can be easily controlled, desirably.

On the other hand, a second functional group may also be present in a second biodegradable resin other than a first biodegradable resin containing a first functional group present therein. As an example of such a case, there is mentioned a combination of a first biodegradable resin in which 3-maleimidepropionic acid is further ester-bonded to 4 hydroxyl groups on both ends in a compound containing pentaerythritol ester-bonded to the end of a carboxyl group of polylactic acid, with a second biodegradable resin in which 3-furylpropionic acid is further ester-bonded to 4 hydroxyl groups on both ends in a compound containing pentaerythritol ester-bonded to the end of a carboxyl group of polylactic acid. The first functional group has a maleimide structure, the second functional group has a furyl structure, and these functional groups are cross-linked in Diels-Alder type. Cross-linking is formed of the molecule end of a first biodegradable resin and the molecule end of a second biodegradable resin.

Further, a resin substance can also be constituted of a mixture containing a first biodegradable resin having both a first functional group and a second functional group, a second biodegradable resin having both a first functional group and a second functional group, a first biodegradable resin having only one of a first functional group and a second functional group, a second biodegradable resin having only one of a first functional group and a second functional group, and the like.

Also in producing such a resin substance, a compound in which a first functional group and a second functional group forming a cross-linked portion are previously covalently bonded, and having a group reacting with a first biodegradable resin material in addition to the first functional group and second functional group can be used as a cross-linking agent. When such a cross-linking agent and a first biodegradable resin material and a second biodegradable resin material are mixed and reacted to allow the cross-linking agent to bond to the first biodegradable resin material and second biodegradable resin material, a resin substance having a portion under cross-linked condition can be obtained with good productivity.

On the other hand, a second functional group is present in a linker, in some cases. In this case, a resin substance is constituted, at least, of a first biodegradable resin having a first functional group and a linker having a second functional group, and as the linker, that not deteriorating the biodegradability of a first biodegradable resin is used. By using a linker, wider resin substances can be obtained, therefore, degrees of freedom of the productivity of a resin substance, the molding property of a resin substance, the abilities of a molded body (mechanical property, heat resistance and the like) and the like are enlarged.

The linker includes monomers, oligomers, polymers and the like having two or more second functional groups in one molecule, and the second functional group in the linker forms a cross-linked portion with a first functional group in a first biodegradable resin. The linker may also use monomers, oligomers, polymers and the like having two or more first functional groups in one molecule, in combination. Resultantly, in a molded body, two or more first biodegradable resins are cross-linked via one or more linkers. In melting, a cross-linked portion is cleaved, and the bonding and cleaving of a cross-linked portion are in a relation of a thermo-reversible reaction. A linker having two or more second functional groups in one molecule may be called a cross-linking agent in some cases, and such a linker and a first biodegradable resin are mixed and reacted, to produce a resin substance. If necessary, a plurality of linker is used in combination in some cases, and a plurality of first biodegradable resins is used in combination in some cases.

As described above, the method (1) in which a functional group for cross-linking is introduced into a biodegradable resin, and the method (2) in which a linker is also used have been explained, and as other methods, a method in which a system for mutually cross-linking linkers is introduced in a usual biodegradable resin can also be used. For example, a resin which is polymerized by a Diels-Alder reaction is partially mixed in a commercially available biodegradable resin. As the resin to be subjected to a Diels-Alder reaction, the linkers described above can be used.

As monomeric linkers, the following compounds are exemplified.

(1) Toluene diisocyanate is used as a linker. In this case, a second functional group is an isocyanate group, and as the first biodegradable resin, for example, biodegradable polyesters having a phenolic hydroxyl group are used. The first functional group is a phenolic hydroxyl group, and an isocyanate group of toluene diisocyanate forms cross-linking with a phenolic hydroxyl group of a biodegradable polyester by urethane bond, and the biodegradable polyester having a phenolic hydroxyl group is cross-linked via toluene diisocyanate.

(2) N,N'-bismaleimide-4,4'-diphenylmethane is used as a linker. In this case, a second functional group has a maleimide structure, and as the first biodegradable resin, for example, polylactic acid in which froic acid is ester-bonded to the end of a hydroxyl group is used. The first functional group is a furyl group, and the maleimide structure of N,N'-bismaleimide-4,4'-diphenylmethane forms cross-linking of Diels-Alder type with a furyl group bonded to polylactic acid, and polylactic acid is cross-linked at one end via N,N'-bismaleimide-4,4'-diphenylmethane.

When a linker contains a plurality of functional groups, if the functional groups are identical, production of a linker is easy, and a cross-linking reaction can be easily controlled, desirably.

(Use of Electrostatically Bondable Cross-Linked Structure in Combination)

Electrostatic bond is what is bonded electrostatically and means a bond formed by electrostatic attractive force, and includes ionic bond and hydrogen bond and the like. These bonds include a case of direct formation by a functional group and a functional group, a case of formation by a functional group and a functional group via an ion, a case of formation by a functional group and a functional group via a polyion, and the like.

As the electrostatic bond directly formed by a functional group and a functional group, a case of formation between ion pair between ionic functional groups is mentioned. As the electrostatic bond formed by a functional group and a functional group via an ion, a case in which two or more ionic functional groups are coordinated to one counter ion by electrostatic attractive force is mentioned. Further, as the electrostatic bond formed by a functional group and a functional group via a polyion, a case in which two or more ionic functional groups are coordinated to one ionic polymer by electrostatic attractive force is mentioned.

A biodegradable resin obtained from a biodegradable resin material has a functional group, and the electrostatic bond mode includes a case in which a functional group forms an ion pair, a case in which a functional group is coordinated to a counter ion by electrostatic attractive force, a case in which a functional group is coordinated to a polyion by electrostatic attractive force, and the like.

The embodiment in which a functional group forms an ion pair is an example of direct formation of electrostatic bond between a functional group and a functional group, and for example, there is a case in which a carboxyl group in a biodegradable resin becomes a carboxylate anion, an amino group in a biodegradable resin becomes an ammonium cation, and these form an ion pair to give an organic salt, or the like.

The embodiment in which a functional group is coordinated to a counter ion by electrostatic attractive force is an example of formation of electrostatic bond via an ion between a functional group and a functional group, and for example, there is a case in which two or more carboxyl groups in a biodegradable resin are ion-bonded to one metal cation, or the like.

Further, the embodiment in which a functional group is coordinated to a polyion by electrostatic attractive force is an example of formation of electrostatic bond between a functional group and a functional group via a polyion, and for example, there are a case in which two or more carboxyl groups in a biodegradable resin are ion-bonded to one polycation such as pentaethylenehexamine and polyamine, a case in which two or more amino groups in a biodegradable resin are ion-bonded to one polyanion such as benzenetricarboxylic acid and polyacrylic acid. As the polyion, monomers having one or more, preferably two or more ionic functional groups; oligomers having one or more, preferably two or more ionic functional groups; polymers having one or more, preferably two or more ionic functional groups, and the like can be used.

The ionic functional group is a functional group decomposed into an ion or bonded with an ion to become itself an ion. The electrostatically bondable cross-linked structure formed from an ionic functional group can be formed from a cationic functional group and an anionic functional group utilizing electrostatic bond. As the cationic functional group, an amino group, imino group and the like are used. As the anionic functional group, a carboxyl group, sulfonyl group, phosphoric group, groups containing a halide ion, hydroxyl group, phenolic hydroxyl group, thiocarboxyl group and the like are used. A cross-linked structure with electrostatically bonding can be formed also by using a molecule having one or more ionic functional groups such as an alkali metal ion, alkaline earth metal ion, transition metal ion, anion, polycation, polyanion and the like, instead of the cationic functional groups and anionic functional groups.

Specific examples of the electrostatic bond type will be illustrated below.

(1) Bonding Via Ion

A cross-linked structure by electrostatic bond via an ion is called ion cross-linking, and in the case of ion cross-linking, for example, a biodegradable resin material having an anionic functional group such as a carboxyl group and the like is used, or that which is obtained by introducing an anionic functional group such as a carboxyl group and the like into a biodegradable resin material is used. A cationic functional group can be introduced as a counter ion of an anionic functional group by neutralizing the biodegradable resin material having a carboxyl group as described above using a halide, inorganic acid salt, sulfate, nitrate, phosphate, organic acid salt, carboxylate or the like as the cationic functional group. For the neutralization treatment, one or more salts selected from the above-mentioned salts may be added directly or added in the form of aqueous solution to a biodegradable resin material in melted condition. Further, after dissolution of a biodegradable resin material in water and/or organic solvent, one or more salts selected from the above-mentioned salts may also be added.

The form of thus obtained biodegradable resin includes a structure in which two or more cations are electrostatically bonded via one anion, a structure in which two or more anions are electrostatically bonded via one cation, and the like.

The ion used for ion cross-linking includes an alkali metal ion, alkaline earth metal ion, transition metal ion, organoammonium, halide ion, carboxylate anion, alcoholate anion, phenolate anion, thiocarboxylate anion, sulfonate anion and the like, and if necessary, two or more ions can also be used in combination.

Of these ions, di- or more-valent ions are preferable from the standpoint of heat resistance.

From the standpoint of the abilities (mechanical property, heat resistance and the like) of the resulting resin substance and molded body, a combination of a biodegradable resin having a carboxyl group and a metal ion is preferable, and as the metal ion, preferable are a sodium ion, calcium ion, zinc ion, magnesium ion, copper ion and the like. If necessary, two or more metal ions can be also used in combination.

The neutralization ratio of a carboxyl group is preferably 1% or more, more preferably 5% or more, further preferably 10% or more, and most preferably 15% or more. The neutralization ratio of a carboxyl group is 100% or less, preferably 95% or less.

In the case of thus obtained biodegradable resin, a structure is obtained in which two or more carboxyl groups are electrostatically bonded via a metal ion.

(2) Bonding Via Polyion

The cross-linked structure by electrostatic bond via a polyion is called polyion cross-linking, and as polycation monomers having one or more, preferably two or more ionic functional groups among polyions used for polyion cross-linking, tetraethylenepentamine, hexanediamine, 2,4,6-triaminotoluene and the like can be used in addition to pentaethylenehexamine.

As polyanion monomers having one or more, preferably two or more ionic functional groups, 2,3-dimethylbutane-1,2,3-tricarboxylic acid and the like can be used in addition to benzenetricarboxylic acid.

As polycation oligomers and polymers having one or more, preferably two or more ionic functional groups, polyamines such as polyvinyiamine, polyethyleneimine and the like can be used in addition to polyamines.

As polyanion oligomers and polymers having one or more, preferably two or more ionic functional groups, polystyrenesulfonic acid, polyphosphoric acid and the like can be used in addition to polyacrylic acid.

(3) Bond by Formation of Organic Salt

A cross-linked portion can be formed, for example, by using a bond formed electrostatically between a cationic functional group such as an amino group and the like, and an anionic functional group such as a carboxylic acid and the like.

(Molding Processing)

In producing a molded body using a biodegradable resin substance forming thermo-reversible cross-linking obtained as described above, inorganic fillers, organic fillers, reinforcing materials, coloring agents, stabilizers (radical scavenger, antioxidant and the like), antibacterial agents, antifungal agents, flame retardants and the like can be used, if necessary.

As the inorganic filler, silica, alumina, talc, sand, clay, slag and the like can be used. As the organic filler, organic fibers such as vegetable fiber and the like can be used. As the reinforcing material, glass fiber, carbon fiber, needle-like inorganic substances, fibrous Teflon resin and the like can be used. As the antibacterial agent, a silver ion, copper ion, zeolite containing them, and the like can be used. As the flame retardant, a silicone-based flame retardant, bromine-based flame retardant, phosphorus-based flame retardant, and the like can be used.

The cleaving temperature of a cross-linked portion should be over 120° C. since sufficient cross-linking is formed at use temperatures of a molded body, on the other hand, the cleaving temperature is preferably 280° C. or less, more preferably 250° C. or less since melt processing can be conducted at temperatures causing no problem of thermal decomposition of a biodegradable resin substance. After melting, a biodegradable resin substance is cooled and shaped. The cooling temperature is preferably 0° C. or more, more preferably 10° C. or more, for formation of sufficient cross-linking, while preferably 100° C. or less, more preferably 80° C. or less. During a cooling process and after a cooling process, a molded body is kept at given temperature in some cases, if necessary, for forming sufficient cross-linking and manifesting the sufficient property of a molded body. By keeping the temperature of a molded body, formation of cross-linking further progresses, and the property of a molded body can be improved.

From the analogous standpoint, also the melting temperature (flow initiation temperature) of a biodegradable resin substance should be over 120° C., while preferably 280° C. or less, more preferably 250° C. or less.

The resin and resin composition as described above can be processed into a molded body for electric and electronic appliance use such as a casing of an electric article, construction material use, automobile part use, daily good use, medical use, agriculture use and the like, by a method such as an injection molding method, film molding method, blow molding method, foaming molding method and the like.

The thermo-reversible cross-linked structure can be utilized in a shape memory resin. As the shape memory resin, there is a resin described in Irie Masahiro et al., Keijo Kioku Polymer no Zairyo Kaihatsu (development of material of shape memory polymer) (ISBN 4-88231-064-3). The shape memory phenomenon generally means a phenomenon in which when a material, after deformation-processed at given temperatures, is heated again, the original shape is recovered. Namely, deformation-processing is conducted at temperatures equal to or higher than the glass transition temperature of a resin, and deformation is fixed by cooling to temperatures equal to or lower than the glass transition temperature. (For use of a resin fixed at normal temperatures, it is necessary that the glass transition temperature is higher than normal temperatures) For recovery of shape, fixation of deformation by glass condition is released, by heating a resin at temperatures equal to or higher than the glass transition temperature. Here, it is possible to use a thermo-reversible cross-linked structure, as a method for fixing this deformation of a resin. When a thermo-reversible cross-linked structure is used for fixation of deformation, it is possible to recover the original shape at temperatures equal to or higher than the glass transition temperature, by setting the cross-linking cleaving temperature at the glass transition temperature or less. U.S. Pat. No. 5,043, 396 is an example of this method. It is also possible to use a thermo-reversible cross-linked structure as a fixation point for memory of shape. A shape memory resin needs a fixation point (or freezing phase) for preventing flow of a resin (creep phenomenon). That using mutual entangling of polymers is called thermoplastic shape memory resin, and by melting, it can be recycled. However, the shape recovery force is weak, and the recovery speed is also slow. In contrast, that using a covalent bond in a fixation point is called thermosetting shape memory resin, and it cannot be melted and consequently cannot be recycled while it has strong shape recovery force and also has high recovery speed. When a thermo-reversible cross-linked structure is used as this fixation point, a shape memory resin showing strong recovery force and high recovery speed and which can be melted and can be recycled can be obtained.

From the above-described facts, among biodegradable resins, preferable are polyester-based resins, and for example, polylactic acid is preferable and polybutylene succinate is also preferable. As the cross-linked portion to be introduced in these biodegradable resins, Diels-Alder type cross-linking or carboxyl-alkenyloxy type cross-linking is preferable. When Diels-Alder type cross-linking or carboxyl-alkenyloxy type cross-linking is thus introduced into a polyester-based biodegradable resin such as polylactic acid and the like, it is particularly preferable that the cross-linked portion has a three-dimensional cross-linked point and it is preferable that the cross-linked density of a three-dimensional cross-linked point is 0.0025 to 0.110. The cleaving temperature of a cross-linked portion is preferably 120° C. or more.

By selecting the chemical structures as described above, heat resistance can be improved, the sufficient material recycling property of a biodegradable resin can be realized, an excellent molding property can be realized, and durability such as moisture resistance and the like can be made sufficient, without losing biodegradability.

The reason for this can be hypothesized as described below.

(i) Artificially synthesized biodegradable resins typically including polylactic acid and polybutylene succinate are, in general, excellent in molding property as compared with polysaccharides of naturally synthesized biodegradable resins.

(ii) Artificially synthesized biodegradable resins typically including polylactic acid and polybutylene succinate are, in general, excellent in mass production property as compared with resins synthesized by a microorganism of naturally synthesized biodegradable resins.

(iii) Since polylactic acid can use lactic acid, a vegetable-derived raw material, among artificially synthesized biodegradable resins, the consumption of fossil fuels can be suppressed, and the generation amount of $CO_2$ can be suppressed.

(iv) Diels-Alder type cross-linking and carboxyl-alkenyloxy type cross-linking are not ionic at use temperatures of 100° C. or less, therefore, they do not promote the hydrolysis of the main chain of polylactic acid and polybutylene succinate. When used in applications of durable materials such as a casing of an electronic appliance and the like, durability (moisture resistance) is required, and the above-mentioned biodegradable resins can be suitably used also in such applications.

(v) By introducing a three-dimensional cross-linked point, a resin formed of a cross-linked substance has a three-dimensional structure, consequently, heat resistance is manifested.

Due to the presence of cross-linked points in sufficient amount, heat resistance can be remarkably improved. On the other hand, when cross-linked density is too high, the proportion of reversibly cross-linked portions occupying a biodegradable resin increases, consequently, the function as a biodegradable resin may be deficient in some cases.

(vi) When the cleaving temperature of a cross-linked portion is 120° C. or more, the heat resistance of a biodegradable resin can be 100° C. or more.

(vii) When the cleaving temperature is 250° C. or less, molding is possible without causing thermal decomposition of the main chain of a biodegradable resin.

The present invention will be illustrated further in detail by examples below, however, they do not limit the scope of the invention. Unless otherwise stated, reagents and the like used are commercially available high purity products. The number-average molecular weight and weight-average molecular weight were measured by a gel permeation chromatogram method, and converted using standard polystyrene.

Abilities were evaluated by the following method.

Heat resistance: The penetration test (according to JIS K 7196, load 0.2 g, needle diameter 3 mm) was conducted using a TMA measuring apparatus manufactured by Shimadzu Corp. (trade name: TMA-40), and under 100° C. or less, that having deformation is represented by x, that having substantially no deformation is represented by ○, and that having utterly no deformation is represented by ⊚. A specimen was kept at 100° C. for 2 hours before measurement.

Cleaving temperature: Using a DSC measuring apparatus manufactured by Seiko Instruments (trade name: DSC 6000), measurement was conducted at a temperature raising rate of 10° C./min, and the endothermic peak was used as the cleaving temperature.

Biodegradability: A molded body (thickness: 0.1 mm) was produced by a heat press (200° C.) and buried in soil, and that showing degradation after 6 months is represented by ○, and that showing no degradation after 6 months is represented by x.

Recycling property: A specimen was heated up to 200° C. to give melt condition and subsequently cooled to normal temperature, and this cycle was repeated 5 times (5 cycles of 200° C. and normal temperature), then, the above-mentioned heat resistance test was conducted, and under 100° C. or less, that showing deformation is represented by x, and that showing no deformation is represented by ○.

Molding property: A specimen of 6.4 mm×12.5 mm×125 mm was injection molded at 200° C., and that which could be molded is represented by ○, and that which could not be molded is represented by x.

Moisture resistance: A specimen was left for 6 months under conditions of 20° C. and 60% RH, then, dried under reduced pressure at 80° C. The viscosity of a resin substance at the molding temperature was measured, and compared with the viscosity before the moisture resistance test.

EXAMPLE 1-1

Into a 3 L separable flask equipped with a stirrer, fractional condenser, thermometer and nitrogen introducing tube were charged 716 g (6.1 mol) of succinic acid and 613 g (6.8 mol) of 1,4-butanediol, and dehydration condensation was conducted under a nitrogen atmosphere at 180 to 220° C. for 3 hours. Subsequently, a de-glycol reaction was conducted under reduced pressure at 180 to 220° C. for 3 hours, and water and vinyl glycol were distilled off, to obtain a both end-hydroxyl group aliphatic polyester (A1) having a number-average molecular weight of 3000.

100 parts by weight of thus obtained both end-hydroxyl group aliphatic polyester (A1) and 6.6 parts by weight of 1,2,3,4-butanetetracarboxylic dianhydride manufactured by New Japan Chemical Co., Ltd. (trade name: Rikacid BT-100, referred to also as compound (B1)) were melt-kneaded at 200° C. by Mini Max Mix Truder (trade name) manufactured by Toyo Seiki K.K., to obtain a composition (1).

EXAMPLE 1-2

100 parts by weight of the both end-hydroxyl group aliphatic polyester (A1) and 7.3 parts by weight of pyromellitic anhydride were melt-kneaded at 200° C. by Mini Max Mix Truder (trade name) manufactured by Toyo Seiki K.K., to obtain a composition (2).

EXAMPLE 1-3

A composition (3) was obtained in the same manner as in the case of the composition (1), except that 10.4 parts by weight of methyl vinyl ether-maleic anhydride copolymer (B2) (number-average molecular weight: 900000) was used instead of the compound (B1) (the number of cross-linked points capable of forming three-dimensional cross-linking is about 0.060 per 100 g of a resin substance).

The abilities of the composition obtained above were evaluated and the results are shown in Table 1.

TABLE 1

| | Evaluation result | | | |
|---|---|---|---|---|
| | heat resistance | biodegradability | recycling property | molding property |
| composition 1 | ○ | ○ | ○ | ○ |
| composition 2 | ○ | ○ | ○ | ○ |
| composition 3 | ○ | ○ | ○ | ○ |
| polyester A1 | X | ○ | ○ | ○ |

From Table 1, it was found that the compositions (1) to (3) are excellent in all abilities of heat resistance, biodegradability, recycling property and molding property.

Polyester Resin M-1 to M-10

(M-1) Both end-hydroxy PBS (polybutylene succinate):1,4-butanediol and succinic acid are charged so that 1,4-butanediol/succinic acid (molar ratio) is more than 1, more preferably 1.05 or more, further preferably 1.1 or more, and a dehydration condensation reaction thereof is conducted, to obtain both end-hydroxyl group PBS having a number-average molecular weight of 100 to 1000000. By reducing pressure at reaction temperatures of 110 to 250° C., the dehydration condensation reaction progresses to increase the molecular weight. Also by adding a catalyst such as tetraisopropoxytitanium and the like in an amount of 0.1 to 5 parts by weight per 100 parts by weight of the monomer mixture, the dehydration condensation reaction progresses to increase the molecular weight.

(M-2) PLA (polylactic acid):lactide (dimer of lactic acid) is ring-opening-polymerized, to obtain polylactic acid having a number-average molecular weight of 100 to 1000000. By setting the reaction temperature at 120 to 220° C., the ring-opening reaction progresses. Also by using stannous octanoate as a catalyst in an amount of 0.01 to 1 part by weight per 100 parts by weight the monomers, the dehydration condensation reaction can be further progressed to increase the molecular weight.

(M-3) End-hydroxy PLA:PLA (M-2) and pentaerythritol, by ester-bonding end-hydroxy PLA (M-3) having a number-average molecular weight of 100 to 1000000 is obtained. By using pyridine and 1-ethyl-3-(3'-dimethylaminopropyl)carbodiimide hydrochloride as dehydration catalysts in equimolar amounts in a chloroform solvent, the esterification reaction can be progressed. Also, it can be purified by washing with water.

(M-4) Both end-phenolic hydroxy PBS: by ester-bonding both end-hydroxy PBS (M-1) and hydroxybenzoic acid, both end-phenolic hydroxy PBS (M-4) having a number-average molecular weight of 100 to 1000000 is obtained. By using pyridine and 1-ethyl-3-(3'-dimethylaminopropyl)carbodiimide hydrochloride as dehydration catalysts in equimolar amounts in a chloroform solvent, the esterification reaction can be progressed.

(M-5) One end-phenolic hydroxy PLA: by ester-bonding PLA (M-2) and hydroxybenzoic acid, one end-phenolic hydroxy PLA (M-5) having a number-average molecular weight of 100 to 100000 is obtained. By using pyridine and 1-ethyl-3-(3'-dimethylaminopropyl)carbodiimide hydrochloride as dehydration catalysts in equimolar amounts in a chloroform solvent, the esterification reaction can be progressed. Also, it can be purified by washing with water.

(M-6) End-phenolic hydroxy PLA: by ester-bonding end-hydroxy PLA (M-3) and hydroxybenzoic acid, end-phenolic hydroxy PLA (M-6) having a number-average molecular weight of 100 to 100000 is obtained. By using pyridine and 1-ethyl-3-(3'-dimethylaminopropyl)carbodiimide hydrochloride as dehydration catalysts in equimolar amounts in a chloroform solvent, the esterification reaction can be progressed. Also, it can be purified by washing with water.

(M-7) Both end-carboxylic acid PBS:1,4-butanediol and succinic acid are charged so that 1,4-butanediol/succinic acid (molar ratio) is preferably less than 1, more preferably 0.95 or less, further preferably 0.9 or less, and a dehydration condensation reaction thereof is conducted, to obtain both end-hydroxyl group PBS having a number-average molecular weight of 100 to 1000000. By reducing pressure at reaction temperatures of 110 to 250° C., the dehydration condensation reaction progresses to increase the molecular weight. Also by adding a catalyst such as tetraisopropoxytitanium and the like in an amount of 0.1 to 5 parts by weight to 100 parts by weight of the monomer mixture, the dehydration condensation reaction progresses to increase the molecular weight.

(M-8) Multi-functional carboxylic acid PBS: by ester-bonding both end-hydroxy PBS (M-1) and pyromellitic acid, multi-functional carboxylic acid PBS (M-8) having a number-average molecular weight of 100 to 1000000 is obtained. By using pyromellitic acid in large excess amount (10 to 100-fold mol) for a hydroxyl group, PBS in which pyromellitic acid is ester-bonded to both ends thereof is obtained. By refluxing both end-hydroxy PBS (M-1) and pyromellitic acid in a mixed solvent of chloroform and THF, or a toluene solvent, the esterification reaction can be progressed. Pyromellitic acid used excessively can be removed by washing with hot water after removal of the solvent.

(M-9) Multi-functional carboxylic acid PLA: by ester-bonding PLA (M-2) and pyromellitic acid, multi-functional carboxylic acid PLA (M-9) having a number-average molecular weight of 100 to 100000 is obtained. By using pyromellitic acid in large excess amount (10 to 100-fold mol) for a hydroxyl group, PLA in which pyromellitic acid is ester-bonded to one end thereof is obtained. By refluxing PLA (M-2) and pyromellitic acid in a mixed solvent of chloroform and THF, or a toluene solvent, the esterification reaction can be progressed. Pyromellitic acid used excessively can be removed by washing with hot water after removal of the solvent.

(M-10) Multi-functional carboxylic acid PLA: by ester-bonding end-hydroxy PLA (M-3) and pyromellitic acid, multi-functional carboxylic acid PLA (M-10) having a number-average molecular weight of 100 to 1000000 is obtained. By refluxing end-hydroxy PLA (M-3) and large excess amount (10 to 100-fold mod) of pyromellitic acid in a mixed solvent of chloroform and THF, or a toluene solvent, the esterification reaction can be progressed. Pyromellitic acid used excessively can be removed by washing with hot water after removal of the solvent.

EXAMPLE 1-4

Diels-Alder Type Cross-Linked Resin

Cyclopentadienyl sodium and excess dry ice are reacted to obtain dicyclopentadienedicarboxylic acid. To this are added a carboxylic acid and oxaallyl chloride in equimolar or more amount in THF, to obtain dicyclopentadienecarboxylic chloride. The solvent is distilled off under reduced pressure at 60° C. Using this as a cross-linking agent, the polyester resins (M-1) to (M-3) are reacted. Hydrochloric acid is removed from a hydroxyl group of a polyester resin and dicyclopentadienecarboxylic chloride, and dicyclopentadienecarboxylic acid is ester-bonded to a hydroxyl group of a polyester resin. Resultantly, a dicyclopentadiene-cross-linked polyester resin is obtained using dicyclopentadiene as a cross-linking portion. The reaction of removing hydrochloric acid progresses at normal temperature under a nitrogen atmosphere in a chloroform solvent, and re-precipitated in a poor solvent, thus, a dicyclopentadiene-cross-linked polyester resin can be recovered. Though the cleaving temperature of a cross-linked portion by dicyclopentadiene is 100 to 250° C., temperatures for obtaining moldable flowability can be controlled by the molecular weight of a polyester resin used, the density of a hydroxyl group and cross-linked density (amount of cross-linking agent used), and the like.

EXAMPLE 1-5

Nitroso Dimer Type Cross-Linked Resin

Using a dimer of 4-nitroso-3,5-dichlorobenzoyl chloride as a cross-linking agent, the polyester resins (M-4), (M-5) and (M-6) having a phenolic hydroxyl group are melt-mixed at 150 to 250° C., to obtain nitroso dimer type cross-linked resins having a nitroso dimer structure as a cross-linked portion. Though the cleaving temperature of a cross-linked portion by a nitroso dimer is 110 to 150° C., temperatures for obtaining moldable flowability can be controlled by the molecular weight of a polyester resin used, the density of a phenolic hydroxyl group and cross-linked density (amount of cross-linking agent used), and the like.

EXAMPLE 1-6

Acid Anhydride Ester Type Cross-Linked Resin

A di- or more-functional acid anhydride is used as a cross-linking agent. As such an acid anhydride, for example, a copolymer (VEMA manufactured by Daicel Chemical Industries, Ltd.) of maleic anhydride and methyl vinyl ether having a weight-average molecule weight of 900000, pyromellitic anhydride, 1,2,3,4-butanetetracarboxylic anhydride (manufactured by New Japan Chemical Co., Ltd., trade name: Rikacid BT-100), (5-dioxotetrahydro-3-solanyl)-3-methyl-3-cyclohexene-1,2-dicarboxylic anhydride (manufactured by DIC, trade name: EPICLON B4400), and the like are used. These acid anhydrides and the polyester resins (M-1) to (M-3) are reacted, and an ester bond is formed from a hydroxyl group of the polyester resin, and the acid anhydride. Resultantly, an acid anhydride ester-cross-linked polyester resin is obtained using an ester bond obtained from the acid anhydride as a cross-linked portion. The esterification reaction progresses by reflux under a nitrogen atmosphere in a mixed solvent of chloroform and THF, or a toluene solvent, and re-precipitated in hexane, poor solvent, thus, an acid anhydride ester-cross-linked polyester resin can be recovered. Though the cleaving temperature of a cross-linked portion by an acid anhydride ester is 100 to 250° C., temperatures for obtaining moldable flowability can be controlled by the molecular weight of a polyester resin used, the density of a hydroxyl group and cross-linked density (amount of cross-linking agent used), and the like.

EXAMPLE 1-7

Halogen-Amine Type Cross-Linked Resin

Hydroxyl groups of the polyester resins (M-1) to (M-3) are ester-bonded to a carboxyl group of 4-bromomethylbenzoic acid, to obtain halogenated polyester resins. By reacting tetramethylhexanediamine as a cross-linking agent with these resins, halogen-amine type cross-linked polyester reins having an ammonium bond as a cross-linked portion is obtained. Though the cleaving temperature of a cross-linked portion by a halogen-amine bond is 100 to 200° C., temperatures for obtaining moldable flowability can be controlled by the molecular weight of a polyester resin used, the density of a hydroxyl group and cross-linked density (amount of cross-linking agent used), and the like.

EXAMPLE 1-8

Urethane Type Cross-Linked Resin

Using toluene diisocyanate and phenylmethane diisocyanate and the like as a cross-linking agent, the polyester resins (M-4), (M-5) and (M-6) having a phenolic hydroxyl group are melt-mixed at 150 to 250° C., to obtain urethane type cross-linked polyester resins having a urethane bond as a cross-linked portion. Though the cleaving temperature of a cross-linked portion by a urethane bond is 120 to 250° C., temperatures for obtaining moldable flowability can be controlled by the molecular weight of a polyester resin used, the density of a phenolic hydroxyl group and cross-linked density (amount of cross-linking agent used), and the like. Also by using a cleaving catalyst such as 1,3-diacetoxytetrabutyl distannoxane and the like in an amount of 0.01 to 1.0 part by weight per 100 parts by weight of the urethane type cross-linked resin, the cleaving temperature can be controlled.

EXAMPLE 1-9

Azlactone-Phenol Type Cross-Linked Resin

Using bisazlactylbutane and the like as a cross-linking agent, the polyester resins (M-4), (M-5) and (M-6) having a phenolic hydroxyl group are melt-mixed at 150 to 250° C., to obtain polyester resins having an azlactone-phenol bond as a cross-linked portion. Though the cleaving temperature of a cross-linked portion by an azlactone-phenol bond is 100 to 200° C., temperatures for obtaining moldable flowability can be controlled by the molecular weight of a polyester resin used, the density of a phenolic hydroxyl group and cross-linked density (amount of cross-linking agent used), and the like.

EXAMPLE 1-10

Carboxyl-Vinyl Ether Type Cross-Linked Resin

Using bis[4-(vinyloxy)butyl] adipate and the like as a cross-linking agent, the polyester resins (M-7) to (M-10) having a carboxyl group are melt-mixed at 150 to 250° C., to obtain carboxyl-vinyl ether type cross-linked polyester resins having a hemiacetal ester bond as a cross-linked portion. Though the cleaving temperature of a cross-linked portion by a hemiacetal ester bond is 100 to 250° C., temperatures for obtaining moldable flowability can be controlled by the molecular weight of a polyester resin used, the density of a carboxyl group, addition of an acid catalyst and cross-linked density (amount of cross-linking agent used), and the like.

EXAMPLE 1-11

Use of Electrostatically Bond for Cross-Linked Structure in Combination

The polyester resins (M-7) to (M-10) obtained above are melted at 100 to 200° C., and ions are added. As the ion source (cation), Cu, Na, Mg, Ca and the like are used. An aqueous solution of copper acetate, sodium acetate, calcium acetate, magnesium acetate and the like is added so that the neutralization degree is preferably 1% or more, more preferably 10% or more and 100% or less, more preferably 95% or more, and immediately, water is distilled off under reduced pressure. Though the cleaving temperature of a cross-linked portion is 100 to 200° C., temperatures for obtaining moldable flowability can be controlled by the molecular weight of a polyester resin used, the density of a carboxyl group, the neutralization degree of a carboxyl group by a metal ion, and the like.

Thus obtained composition is mixed, for example, with the above-mentioned carboxyl-vinyl ether type cross-linked resin, to use a covalently bondable cross-linked structure and a cross-linked structure with electrostatically bonding in combination.

EXAMPLE 1-12

Use of Electrostatically Bondable Cross-Linked Structure in Combination

The above-mentioned carboxyl-vinyl ether type cross-linked resin is melted at 100 to 200° C., and ions are added to this, to use a covalently bondable cross-linked structure and a cross-linked structure with electrostatically bonding in combination. As the ion source (cation), Cu, Na, Mg, Ca and the like are used.

EXAMPLE 2-1

Diels-Alder Type Cross-Linked Biodegradable Resin 1

Using stannous octanoate as a catalyst in an amount of 0.05 parts by weight per 100 parts by weight of lactide (dimer of lactic acid), the lactide was ring-opening-polymerized at a reaction temperature of 200° C., to obtain PLA having a number-average molecular weight of 100000 (C-1). To PLA (1000 g) was added glycerin (0.5 mol, 46 g), and a transesterification reaction was conducted at 180° C. for 6 hours. This was dissolved in chloroform and washed with an alkali aqueous solution, then, the solvent was distilled off to obtain end-hydroxy PLA (C-2) having a number-average molecular weight of 4000.

Cyclopentadienyl sodium (1.6 mol THF solution, 1 L) and dry ice (2 kg) were reacted, to obtain dicyclopentadienedicarboxylic acid. To this was added oxaallyl chloride in equimolar or more amount in THF, to obtain dicyclopentadienecarboxylic chloride. The solvent was distilled off under reduced pressure at 60° C. The above-mentioned end-hydroxy PLA (100 g) was dissolved in chloroform (3 L), and dicyclopentadienedicarboxylic chloride (0.038 mol) and equimolar pyridine were added and reacted at normal temperature for 24 hours, then, unreacted materials and impurities were removed by washing. By distilling off the solvent, a dicyclopentadiene-cross-linked polyester resin was recovered (the number of cross-linked points capable of forming three-dimensional cross-linking is about 0.023 per 100 g of a resin substance).

EXAMPLE 2-2

Diels-Alder Type Cross-Linked Biodegradable Resin 2

Glycerin (2 mol, 184 g) was added to 1 mol of PLA (C-1) obtained in the same manner as in the case of the Diels-Alder type cross-linked biodegradable resin 1, and a transesterification reaction thereof was conducted at 180° C. for 6 hours. This was dissolved in chloroform, and washed with an alkali aqueous solution, then, the solvent was distilled off, to obtain end-hydroxy PLA (C-3) having a number-average molecular weight of 1000.

The above-mentioned end-hydroxy PLA (100 g) was dissolved in chloroform (3 L), and dicyclopentadienedicarboxylic chloride (0.15 mol) obtained in the case of the Diels-Alder type cross-linked biodegradable resin 1 and equimolar pyridine were added and reacted at normal temperature for 24 hours, then, unreacted materials and impurities were removed by washing. By distilling off the solvent, a dicyclopentadiene-cross-linked polyester resin was recovered (the number of cross-linked points capable of forming three-dimensional cross-linking is about 0.078 per 100 g of a resin substance).

EXAMPLE 2-3

Diels-Alder Type Cross-Linked Biodegradable Resin 3

According to the same manner as in the means of Chan-Ming D. et al. (Polymer, vol. 42, p. 6891, 2001), using trimethylolpropane in an amount of 0.16 parts by weight and stannous octanoate as a catalyst in the amount of 0.06 parts by weight per 100 parts by weight of lactide, the lactide was ring-opening-polymerized at 110° C. for 100 hours, to obtain PLA having a number-average molecular weight of 40000 (C-4).

The above-mentioned end-hydroxy PLA (100 g) was dissolved in chloroform (3 L), and dicyclopentadienedicarboxylic chloride (0.0038 mol) obtained in the case of the Diels-Alder type cross-linked biodegradable resin 1 and equimolar pyridine were added and reacted at normal temperature for 24 hours, then, unreacted materials and impurities were removed by washing. By distilling off the solvent, a dicyclopentadiene-cross-linked polyester resin was recovered (the number of cross-linked points capable of forming three-dimensional cross-linking is about 0.0025 per 100 g of a resin substance).

EXAMPLE 2-4

Carboxyl-Alkenyloxy Type Cross-Linked Biodegradable Resin 1

100 g of PLA (C-2) obtained in the case of the Diels-Alder type cross-linked biodegradable resin 1 was dissolved in chloroform (3 L), and succinic anhydride (0.075 mol) and pyridine (0.05 g) as a catalyst were added, and they were refluxed for 6 hours. After the reaction, pyridine was extracted and washed, then, the solvent was removed, to obtain end-carboxylic acid PLA resin (C-4). Into 100 g of this resin (A-4) was melt-kneaded 11.7 g of tris[4-(vinyloxy)butyl] trimellitate as a linker by Mini Max Mix Truder (trade name) manufactured by Toyo Seiki K.K., to obtain a composition (the number of cross-linked points capable of forming three-dimensional cross-linking is about 0.034 per 100 g of a resin substance).

EXAMPLE 2-5

Carboxyl-Alkenyloxy Type Cross-Linked Biodegradable Resin 2

100 g of PLA (C-3) obtained in the case of the Diels-Alder type cross-linked biodegradable resin 2 was dissolved in chloroform (3 L), and succinic anhydride (0.30 mol) and pyridine (0.05 g) as a catalyst were added, and they were refluxed for 6 hours. After the reaction, pyridine was extracted and washed, then, the solvent was removed, to obtain end-carboxylic acid PLA resin (C-4). Into 100 g of this resin (C-5) was melt-kneaded 38.8 g of tris[4-(vinyloxy)butyl] trimellitate as a linker by Mini Max Mix Truder (trade name) manufactured by Toyo Seiki K.K., to obtain a composition (the number of cross-linked points capable of forming three-dimensional cross-linking is about 0.110 per 100 g of a resin substance).

EXAMPLE 2-6

Diels-Alder Type Cross-Linked Biodegradable Resin (not Three-Dimensional Cross-Linking)

To PLA (C-1) obtained in the same manner as in the case of the Diels-Alder type cross-linked biodegradable resin 1 was added butanediol (0.5 mol, 45 g), and a transesterification reaction was conducted at 180° C. for 6 hours. This was dissolved in chloroform, and washed with an alkali aqueous solution, then, the solvent was distilled off, to obtain end-hydroxy PLA (C-6) having a number-average molecular weight of 3000.

The above-mentioned end-hydroxy PLA (100 g) was dissolved in chloroform (3 L), and dicyclopentadienedicarboxylic chloride (0.033 mol) obtained in Example 1 was added, and they were reacted at normal temperature for 24 hours, then, the solvent was distilled off to recover a dicyclopentadiene-cross-linked polyester resin (containing no cross-linked points capable of forming three-dimensional cross-linking).

The above-mentioned evaluation results are shown in Table 2.

TABLE 2

| biodegradable resin | Evaluation result | | | | | | |
|---|---|---|---|---|---|---|---|
| | three-dimensional cross-linked density | cleaving temperature | heat resistance | biodegradability | recycling propertiy | molding property | wet resistance |
| Diels-Alder type cross-linked biodegradable resin 1 | 0.023 | 190° C. | ⊚ | ○ | ○ | ○ | 95% |
| Diels-Alder type cross-linked biodegradable resin 2 | 0.078 | 190° C. | ⊚ | ○ | ○ | ○ | 95% |
| Diels-Alder type cross-linked biodegradable resin 3 | 0.0025 | 190° C. | ⊚ | ○ | ○ | ○ | 95% |
| carboxyl-alkenyloxy type cross-linked biodegradable resin 1 | 0.034 | 195° C. | ⊚ | ○ | ○ | ○ | 95% |

TABLE 2-continued

| biodegradable resin | three-dimensional cross-linked density | cleaving temperature | heat resistance | biodegradability | recycling propertiy | molding property | wet resistance |
|---|---|---|---|---|---|---|---|
| carboxyl-alkenyloxy type cross-linked biodegradable resin 2 | 0.110 | 195° C. | ◎ | ○ | ○ | ○ | 95% |
| Diels-Alder type cross-linking (no three-dimensional cross-linking) | 0 | 190° C. | ○ | ○ | ○ | ○ | 95% |
| acid anhydride type cross-linked biodegradable resin (composition 3) | 0.060 | 180° C. | ○ | ○ | ○ | ○ | 50% |
| A-1 | 0 | none | X | ○ | ○ | ○ | 90% |
| C-1 | 0 | none | X | ○ | ○ | ○ | 99% |

As apparent from Table 2, all biodegradable resins have sufficient abilities, and particularly, in the case of a resin containing introduced three-dimensional cross-linking, heat resistance is particularly high. When the cross-linked structure is a Diels-Alder type or carboxyl-alkenyloxy type, heat resistance and moisture resistance are high.

What is claimed is:

1. A biodegradable moldable resin having a Diels-Alder type functional group selected from the group consisting of an alkenyl group and a group having a conjugated double bond wherein said biodegradable moldable resin is polybutylene succinate or modified body of the polybutylene succinate.

2. The biodegradable moldable resin according to claim 1, wherein said biodegradable moldable resin has a three-dimensional cross-linked structure, and the cross-linked density of the three-dimensional cross-linked structure is 0.0001 to 1.

3. The biodegradable moldable resin according to claim 1, wherein the main chain of said biodegradable moldable resin has at least one of a linear structure and branched structure.

4. The biodegradable moldable resin according to claim 1, wherein one or more of said functional groups are present at the same site, at least one of the end and side chain of said biodegradable moldable resin.

5. The biodegradable moldable resin according to claim 1, wherein an electrostatically bondable and thermo-reversible cross-linked structure is used together.

6. The biodegradable moldable resin of claim 1 wherein the functional group is selected from the group consisting of cyclic dienes and cyclic dienophiles.

* * * * *